United States Patent [19]

Inaba

[11] Patent Number: 4,695,237
[45] Date of Patent: Sep. 22, 1987

[54] INJECTION MOLDING APPARATUS
[75] Inventor: Yoshiharu Inaba, Kawasaki, Japan
[73] Assignee: FANUC LTD, Minamitsuru, Japan
[21] Appl. No.: 752,525
[22] PCT Filed: Dec. 26, 1984
[86] PCT No.: PCT/JP84/00619
§ 371 Date: Jul. 8, 1985
§ 102(e) Date: Jul. 8, 1985
[87] PCT Pub. No.: WO85/02813
PCT Pub. Date: Jul. 4, 1985

[30] Foreign Application Priority Data

Dec. 28, 1983 [JP] Japan ................. 58-245422

[51] Int. Cl.$^4$ ................. B29C 45/77; B29C 45/78
[52] U.S. Cl. ................. 425/135; 264/40.7;
364/148; 364/473; 364/476; 364/477; 425/143;
425/144; 425/149; 425/171
[58] Field of Search ............. 425/135, 143, 144, 149,
425/150, 157, 159, 160, 170, 171, 451.2;
264/40.3, 40.6, 40.7; 164/155; 364/148, 152,
473, 476, 477

[56] References Cited
U.S. PATENT DOCUMENTS 3,566,439 3/1971 Mouly et al. ................. 425/144
3,767,339 10/1973 Hunkar ................. 425/149
4,262,737 4/1981 Faillace ................. 425/144
4,540,359 9/1985 Yamazaki ................. 425/157
4,559,991 12/1985 Motomura et al. ................. 164/155

FOREIGN PATENT DOCUMENTS 84642 6/1977 Japan .
115864 9/1977 Japan .
30839 3/1978 Japan .

Primary Examiner—Jay H. Woo
Assistant Examiner—Timothy W. Heitbrink
Attorney, Agent, or Firm—Staas & Halsey

[57] ABSTRACT

An injection molding apparatus for automatically presetting parameters of injection conditions by performing trial injection. A time (T0) and an injection quantity (C0) are obtained (step 124), wherein a drive current (I2) of a servo motor (M2) for performing trial injection reaches a drive current (i0, step 123) corresponding to a maximum injection pressure. Parameters (A, B, D) of the injection conditions stored in a memory, are read out in accordance with the detected time (T0) and the detected injection quantity (C0) to automatically set the injection conditions (step 131).

11 Claims, 3 Drawing Figures

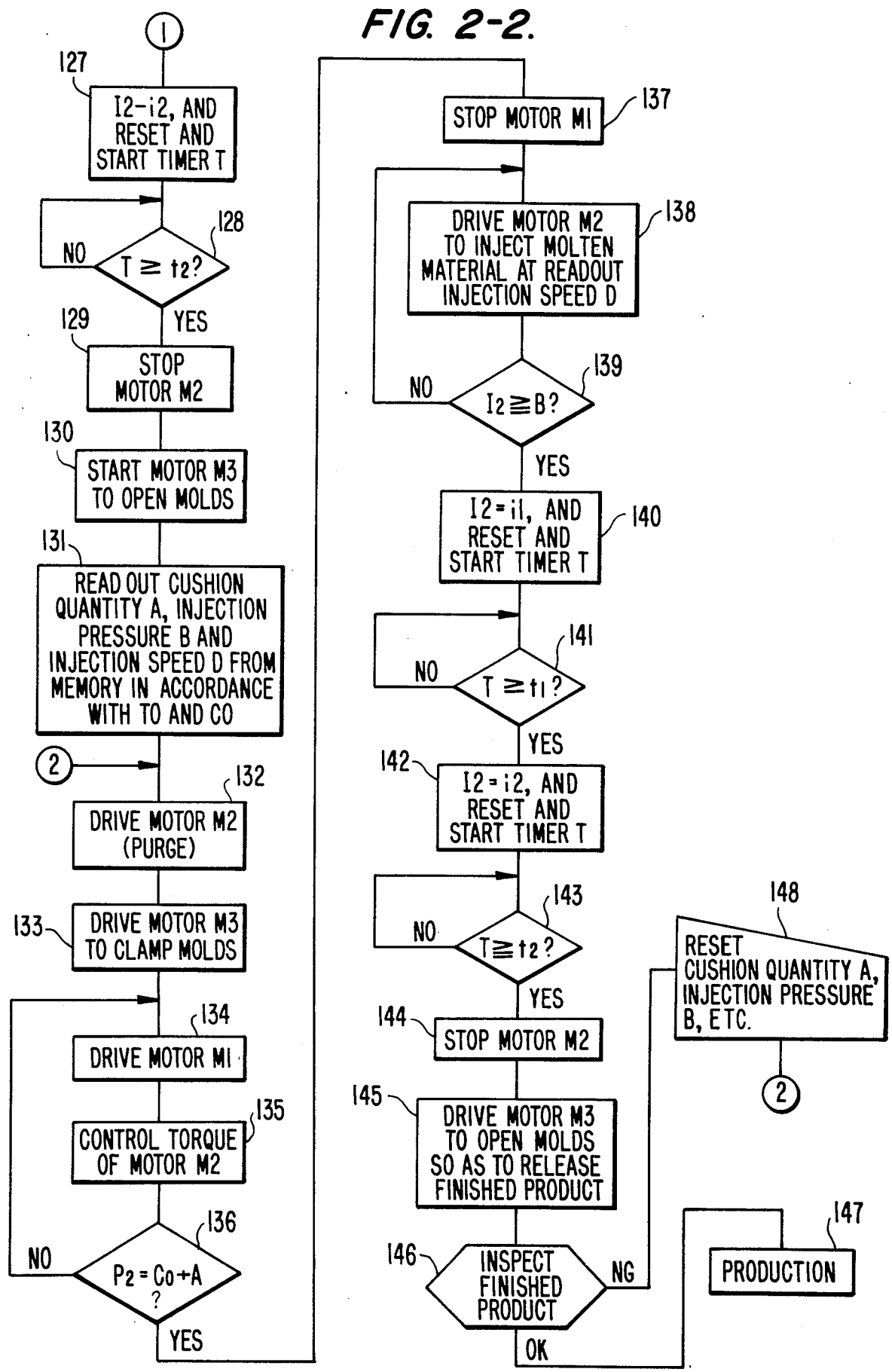

INJECTION MOLDING APPARATUS

BACKGROUND OF THE INVENTION

The present invention relates to an injection molding apparatus for melting a molding material to perform injection molding, wherein injection conditions can be automatically set.

In order to prepare a new product in a conventional injection molding apparatus, new molds are mounted therein to perform trial injection molding to preset parameters of injection molding conditions, such as an injection speed and an injection pressure. In this manner, optimal values are selected in accordance with a trial-and-error scheme. For this reason, skilled operators are required to preset such parameters, and even for skilled operators it takes a long period of time and a wealth of experience to set these parameters. Another conventional parameter preset scheme is known wherein initial conditions are determined by a program. Even in this case, parameters of the injection molding conditions change in accordance with conditions of molds and the external atmosphere. As a result, it is difficult to obtain optimal values.

SUMMARY OF THE INVENTION

It is an object of the present invention to solve the conventional drawbacks and to provide an injection molding apparatus for automatically setting injection conditions by performing trial injection.

In order to achieve the above object of the present invention, there is provided an injection molding apparatus comprising injection pressure detecting means for detecting an injection pressure, injection time detecting means for detecting an injection time, injection quantity detecting means for detecting an injection quantity, and a memory device for storing optimal values of parameters such as a cushion quantity, an injection pressure and an injection speed, for injection conditions corresponding to a time interval from a time at which injection is started to a time at which a maximum injection pressure is obtained and an injection quantity for the time interval, whereby trial injection is performed to cause the injection time detecting means and the injection quantity detecting means to detect a time and an injection quantity for which the injection pressure detecting means detects the maximum injection pressure, values of the parameters of the injection conditions are read out from the memory device in accordance with the detected time and the detected injection quantity, and the injection conditions are set to be readout values.

According to the present invention, when molds are replaced, trial injection is performed to obtain the time required for obtaining the maximum injection pressure and the corresponding injection quantity, and corresponding parameter values of the optimal injection conditions are automatically read out from a table in the memory device. Therefore, optimal injection conditions can be obtained by single trial injection. Even if injection conditions change in accordance with the external atmosphere or the like, substantially optimal injection conditions can be automatically set after a few trial injection cycles are performed to simply preset the optimal injection conditions. In contrast to the conventional injection molding apparatus, a long period of time is not required to preset the injection conditions. According to the present invention, since the injection conditions can be automatically preset, the injection conditions can be easily preset by unskilled operators. In contrast to the conventional injection molding apparatus, skilled operators who rely on their wide experience are not required.

BRIEF DESCRIPTION OF THE DRAWINGS

FIGS. 2-1 and 2-2 are flow charts for explaining the operation of the injection molding apparatus of FIG. 1.

DETAILED DESCRIPTION OF THE PREFERRED EMBODIMENT

The present invention will be described in detail with reference to the accompanying drawings.

Figure 1:
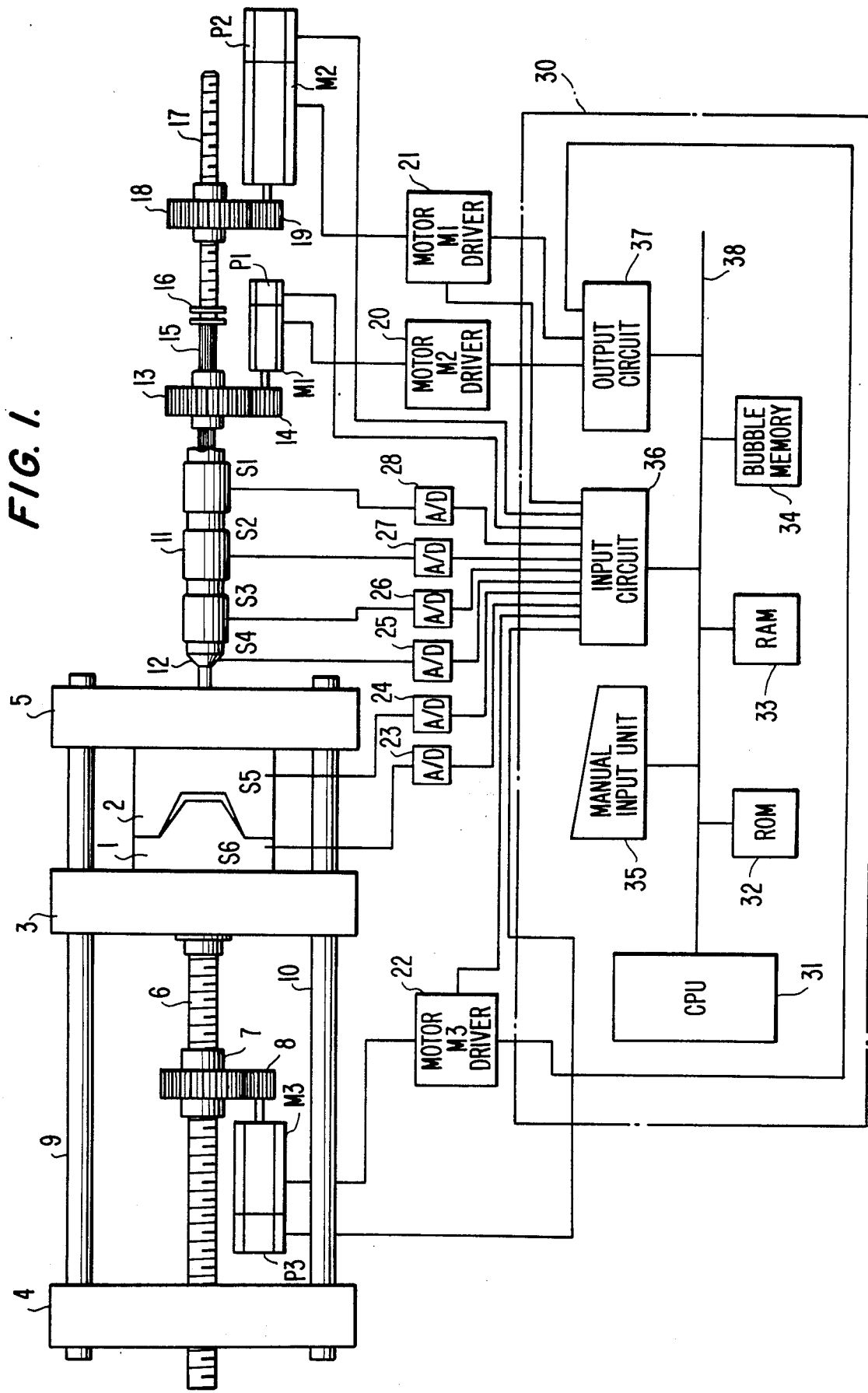
FIG. 1 is a block diagram of an injection molding apparatus according to an embodiment of the present invention.

FIG. 1 is a block diagram of an injection molding apparatus according to an embodiment of the present invention. Reference numerals 1 and 2 denote molds; 3, a carrier; and 4 and 5, fixed bases, respectively. The molds 2 and 1 are fixed on the base 5 and the carrier 3, respectively. Reference numeral 6 denotes a ball screw fixed on the carrier 3. The ball screw 6 is moved in the right-and-left direction in FIG. 1 when a gear 8 and a nut 7 having a threaded portion meshed with the gear 8 are rotated by a servo motor M3, thereby moving the carrier 3 to open/close the molds 1 and 2. Reference numeral 11 denotes a heating cylinder; and 12, a nozzle arranged at a distal end of the heating cylinder 11. Temperature sensors S1 to S6 are arranged in the heating cylinder 11, the nozzle 12 and the molds 1 and 2. Reference numeral 15 denotes a spline shaft coupled to a screw shaft for a screw in the heating cylinder 11. A gear 13 having a spline hole is engaged with the spline shaft 15. A servo motor M1 drives the gear 13 through a gear 14, thereby rotating the screw. The spline shaft 15 of the screw shaft is coupled to a ball screw 17 through a thrust bearing 16, and the ball screw 17 is screwed in a nut 18 having a gear. When a servo motor M2 is driven, the nut 18 is rotated through a gear 19, so that the ball screw 17 is moved to the left in FIG. 1, thereby performing injection. Reference symbols P1 to P3 denote position sensors arranged in the servo motors M1 to M3, respectively. Reference numeral 30 denotes a controller; 31, a central processing unit (to be referred to as a CPU hereinafter); 32, a ROM for storing a control program for the controller 30; 33, a RAM for temporarily storing data; 34, a bubble memory for storing a table for parameters such as resin data, a cushion quantity, an injection pressure and an injection speed (to be described later); 35, a manual input device; and 36, an input circuit. The input circuit 36 receives digital signals from A/D converters for converting signals of the position sensors P1 to P3 and the temperature sensors S1 to S6, and digital signals from a drive current detector for drivers 21 and 22 for the servo motors M2 and M3. In this embodiment, a torque (i.e., an injection pressure) of the servo motor M2 is detected by the drive current detector in the driver 21 of the servo motor M2. The drive current detector in the driver 21 for the servo motor M2 constitutes an injection pressure detecting means. A clamping force of the molds is detected by a detection current from the drive current detector in the driver 22 for the servo motor M3. Reference numeral 37 denotes an output circuit for generating an output signal to the drivers 20 to 22 for the servo motors M1 to M3.

The operation of the injection molding apparatus of this embodiment will be described with reference to the flow charts of FIGS. 2-1 and 2-2.

New molds 1 and 2 are mounted on the carrier 3 and the base 5, respectively. A material for a new product to be molded by the molds 1 and 2 is selected and input by the manual input device 35 (step 101). The CPU 31 reads out temperatures T1 to T6 at the respective points of the heating cylinder 11, the nozzle 12, and the molds 1 and 2 from the bubble memory 34. The readout temperatures T1 to T6 are compared with the digital signals converted from the signals detected by the temperature sensors S1 to S6 (steps 103 to 108). The CPU 31 waits until the actually measured temperatures (S1 to S6) exceed the readout temperatures T1 to T6.

Figures 1, 2:
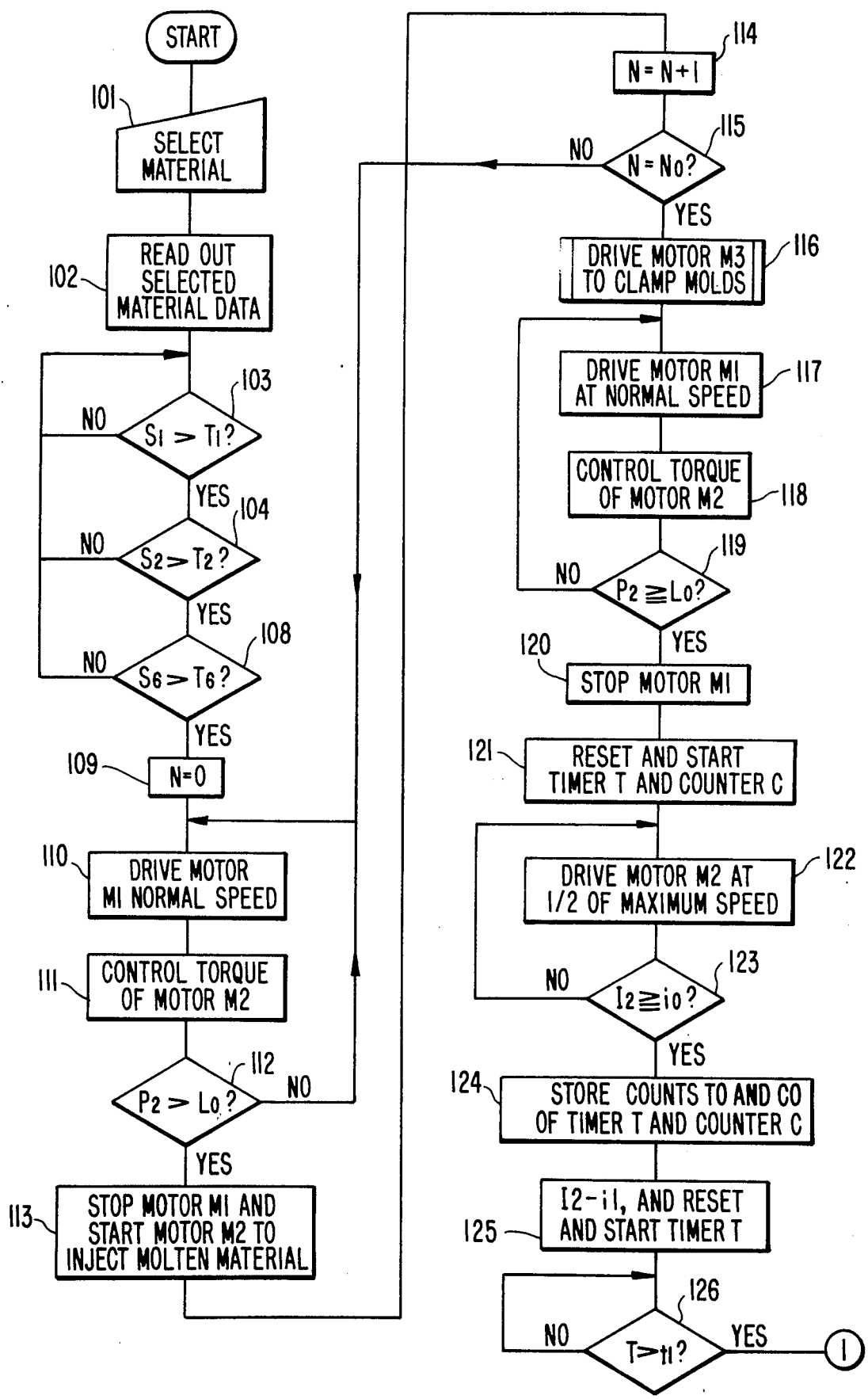

Referring to FIG. 2-1, a comparison step for comparing outputs from the temperature sensors S3 to S5 with the readout temperatures T3 to T5 is omitted.

When the actually measured temperatures reach the readout temperatures, the CPU 31 sets an index N to be zero (step 109) to drive the servo motor M1 through the output circuit 37 and the motor M1 driver 20, thereby rotating the screw (step 110). Upon rotation of the screw, the resin material is held in a molten state. When the molten material quantity is increased, the screw is pushed backward by a reaction force of the molten resin. The CPU 31 controls a drive current for the servo motor M2, i.e., the torque of the servo motor M2 (step 111) to move the screw backward while applying predetermined back pressure on the screw. A position of the screw is detected in accordance with a signal from the position sensor P2 of the servo motor M2. The screw is withdrawn until the position corresponds to a maximum metering quantity L0 of the injection molding apparatus (step 112). When the maximum metering quantity L0 is obtained, the servo motor M1 is stopped, and the servo motor M2 is started to move the ball screw 17 to the left in FIG. 1. The screw is moved forward to perform injection (step 113). In this case, the molten material is not injected into the molds but outside the molds. The index N is incremented by 1 (step 114). The molten resin is injected outside the molds after step 110 until the index reaches a predetermined value N0, e.g., 3 (step 115). When the molten resin is injected outside the molds a predetermined number of times, the servo motor M3 is driven to move the ball screw 6 to the right in FIG. 1 to clamp the molds 1 and 2 (step 116). At the same time, as described above, the servo motor M1 is driven at a normal velocity, the torque of the servo motor M2 is controlled, and the screw is withdrawn to the position corresponding to the maximum metering quantity L0 so as to meter the molten resin (steps 117 to 119). When the maximum metering quantity L0 is obtained, the servo motor M1 is stopped, and the injection time detecting means and the injection quantity detecting means are started.

In this embodiment, the injection time detecting means comprises a timer T, and the injection quantity detecting means comprises a counter C for counting the number of output pulses supplied to the servo motor M2. The timer T and the counter C are reset and started (steps 120 and 121). At the same time, the servo motor M2 is driven at a speed, e.g., ½ the maximum speed, to move the screw forward to perform injection (step 122). A drive current I2 of the servo motor M2 is detected by the drive current detector as the injection pressure detecting means. The CPU 31 checks whether or not the drive current has reached a drive current i0 corresponding to the maximum injection pressure (step 123). If YES in step 123, a count T0 of the timer T and a count C0 of the counter C are stored (step 124). As a result, the count T0 of the timer T represents a time required for obtaining the maximum injection pressure, and the count C0 of the counter C represents the corresponding injection quantity. The drive current I2 of the servo motor M2 is set to a drive current i1 required for primary pressure holding. At the same time, the timer T is reset and started again, and the CPU 31 waits until the count of the timer T reaches the primary pressure holding time t1 (steps 125 and 126). The drive current I2 of the servo motor M2 is set to be a secondary pressure holding current i2, the timer T is reset and started again, and the pressure is maintained until a secondary pressure holding time t2 has elapsed (steps 127 and 128). When the secondary pressure holding time has elapsed, the servo motor M2 is stopped, and then the servo motor M3 is started to open the molds 1 and 2, thereby releasing the product (steps 129 and 130). The CPU 31 reads out a cushion quantity A, an injection pressure B and an injection speed D from the table in the bubble memory 34 in accordance with the detected maximum injection pressure time T0 and the corresponding injection quantity C0, and the readout data are set in the RAM 33 (step 131). The servo motor M2 is driven again to inject the residual molten material in the heating cylinder outside the molds. The servo motor M3 is driven to clamp the molds (steps 132 and 133). The servo motor M1 is driven again to rotate the screw (step 134). The torque control of the servo motor M2 is performed (step 135) to withdraw the screw while applying the back pressure on the screw, thereby performing the metering operation. When a value detected by the position sensor P2 reaches a sum of the injection quantity C0 and the cushion quantity A read out from the table in the bubble memory 34 (step 136), the servo motor M1 is stopped (step 137) to stop metering of the molten material. The servo motor M2 is driven to move the screw at the preset injection speed D, thereby performing injection (step 138). When the drive current I2 of the servo motor M2 reaches a current B' corresponding to the preset injection pressure (step 139), the drive current I2 is changed to the current i1 corresponding to the primary pressure holding value and the timer T is reset and started (step 140). When the count of the timer reaches the primary pressure holding time t1, the drive current I2 of the servo motor M2 is converted to the current i2 for the secondary pressure holding time, and the timer T is reset and started again (steps 141 and 142). When the count of the timer T reaches the secondary pressure holding time t2, the servo motor M2 is stopped and then the servo motor M3 is driven to open the molds, thereby releasing the product (steps 143 to 145). When the product is detected (step 146) to comply with specifications, products are manufactured under the present injection conditions (step 147). However, when shortage or excess use of material is detected in the product, or when sink marks and warpage occur, the injection conditions such as the cushion quantity and the injection pressure are increased/decreased, so as to reset the injection conditions (step 148). The operations after step 132 are repeated to set the parameters of the injection conditions for optimal products.

What is claimed is:

1. An automatic injection conditions setting apparatus for use in an injection molding apparatus comprising:

injection pressure detecting means for detecting an injection pressure;

injection time detecting means for detecting an injection time;

injection quantity detecting means for detecting an injection quantity;

a memory device for storing optimal values of parameters, including a cushion quantity, an injection pressure and an injection speed, for injection conditions corresponding to a time interval from a time at which injection is started to a time at which a maximum injection pressure is obtained, and an injection quantity for the corresponding time interval; and control means, operable during trial injection, for causing said injection time detecting means and said injection quantity detecting means to detect a time and an injection quantity for which said injection pressure detecting means detects the maximum injection pressure, so long as the trial injection is being performed, and for reading out values of the parameters of the injection conditions from said memory device in accordance with the detected time and the detected injection quantity, to automatically set the readout values of the parameters of the injection conditions as optimal values of the injection conditions for production of injection molding products.

2. An apparatus according to claim 1, further comprising:

a servo motor, having a drive current, for performing injection; and a screw coupled to said servo motor, wherein said injection pressure detecting means detects the drive current of said servo motor when said servo motor moves said screw forward, thereby detecting the injection pressure.

3. An apparatus according to claim 1, further comprising:

a screw; and a servo motor, coupled to said screw, for receiving output pulses and moving said screw forward, wherein said injection quantity detecting means counts the number of output pulses supplied to said servo motor while said screw is moved by said servo motor, thereby detecting the injection quantity.

4. An apparatus according to claim 1, further comprising a manual input device for manually updating the parameters of the injection conditions.

5. An apparatus according to claim 1, further comprising:

molds;

a nozzle for injecting molding material into said molds;

a heating cylinder coupled to said nozzle; and temperature sensors for respectively detecting temperatures at said molds, said heating cylinder and said nozzle, wherein the stored optimal values of the parameters include preset temperatures of the molding material at said molds, said heating cylinder and said nozzle, which are stored in said memory device, are compared with the actual temperatures measured by said temperature sensors, so that metering of a molten material is started after the actual measured temperatures reach the preset temperatures, respectively, wherein injection is started when a maximum metering value is obtained, and wherein said injection time detecting means and said injection quantity detecting means detect an injection time and an injection quantity which correspond to the maximum injection pressure detected by said injection pressure detecting means.

6. An apparatus according to claim 1, further comprising:

a screw; and a servo motor, coupled to said screw, for receiving output pulses and moving said screw forward, wherein said injection quantity detecting means causes said servo motor to move said screw forward and counts the number of output pulses supplied to said servo motor, thereby detecting the injection quantity.

7. An apparatus according to claim 1, wherein the injection molding apparatus includes molds, and wherein said control means includes means for causing the molten material to be injected outside the molds a predetermined number of times prior to the trial injection.

8. An apparatus according to claim 2, wherein the injection molding apparatus includes molds, and wherein said control means includes means for causing the molten material to be injected outside the molds a predetermined number of times prior to the trial injection.

9. An apparatus according to claim 3, wherein the injection molding apparatus includes molds, and wherein said control means includes means for causing the molten material to be injected outside the molds a predetermined number of times prior to the trial injection.

10. An apparatus according to claim 4, wherein the injection molding apparatus includes molds, and wherein said control means includes means for causing the molten material to be injected outside the molds a predetermined number of times prior to the trial injection.

11. An apparatus according to claim 5, wherein the injection molding apparatus includes molds, and wherein said control means includes means for causing the molten material to be injected outside the molds a predetermined number of times prior to the trial injection.

* * * * *